United States Patent [19]

Glascock, II et al.

[11] 4,444,352

[45] Apr. 24, 1984

[54] METHOD OF THERMO-COMPRESSION DIFFUSION BONDING TOGETHER METAL SURFACES

[75] Inventors: Homer H. Glascock, II; Harold F. Webster, both of Scotia, N.Y.

[73] Assignee: General Electric Company, Schenectady, N.Y.

[21] Appl. No.: 302,950

[22] Filed: Sep. 17, 1981

[51] Int. Cl.³ .................... B23K 20/02; B23K 20/14
[52] U.S. Cl. .................................. 228/193; 228/106; 228/219; 228/234
[58] Field of Search ............... 228/106, 193, 44.1, 228/219, 237, 263 G, 234, 194

[56] References Cited

U.S. PATENT DOCUMENTS

| | | | |
|---|---|---|---|
| 2,094,482 | 9/1937 | Weder | 228/234 |
| 3,091,846 | 6/1963 | Henry | 228/219 |
| 3,110,961 | 11/1963 | Melill | 228/106 |
| 3,228,104 | 1/1966 | Emeis | 228/234 |
| 3,295,089 | 12/1966 | Moore | 357/81 |
| 3,412,917 | 11/1968 | Omley | 228/44.1 R |
| 4,204,628 | 5/1980 | Houston | 228/106 |
| 4,252,263 | 2/1981 | Houston | 228/193 |
| 4,257,156 | 3/1981 | Houston | 228/194 |

FOREIGN PATENT DOCUMENTS

| | | | |
|---|---|---|---|
| 55-36055 | 3/1980 | Japan | 228/106 |
| 595100 | 2/1978 | U.S.S.R. | 228/193 |

OTHER PUBLICATIONS

J. W. Butler and H. H. Glascock, II, "Dual SCR Power Module", Proceedings of the IEEE 1980 National Aerospace and Electronics Conference, NAECON 1980 (Dayton, Ohio, May 20-22, 1980), vol. 2, pp. 598-604.

N. T. Panousis & P. M. Hall, "Thermocompression Bonding of Copper Leads Plated with Thin Gold", 1977 Proceedings of 27th Electronic Components Conference, pp. 220-224.

N. T. Panousis, "Thermocompression Bondability of Bare Copper Leads", 1978 Proceedings of 28th Electronics Components Conference, pp. 380-386.

Primary Examiner—Nicholas P. Godici
Assistant Examiner—Marc Hodak
Attorney, Agent, or Firm—Charles E. Bruzga; James C. Davis, Jr.; Marvin Snyder

[57] ABSTRACT

A first metal surface of a first article of metal, such as the metalization layer on a silicon semiconductor device, is bonded to an opposing or second metal surface of a second article of metal, such as a "structured copper" strain buffer, using an improved method of thermo-compression diffusion bonding that involves temperature control independent of compressional force control, whereby a superior bond is obtained.

29 Claims, 6 Drawing Figures

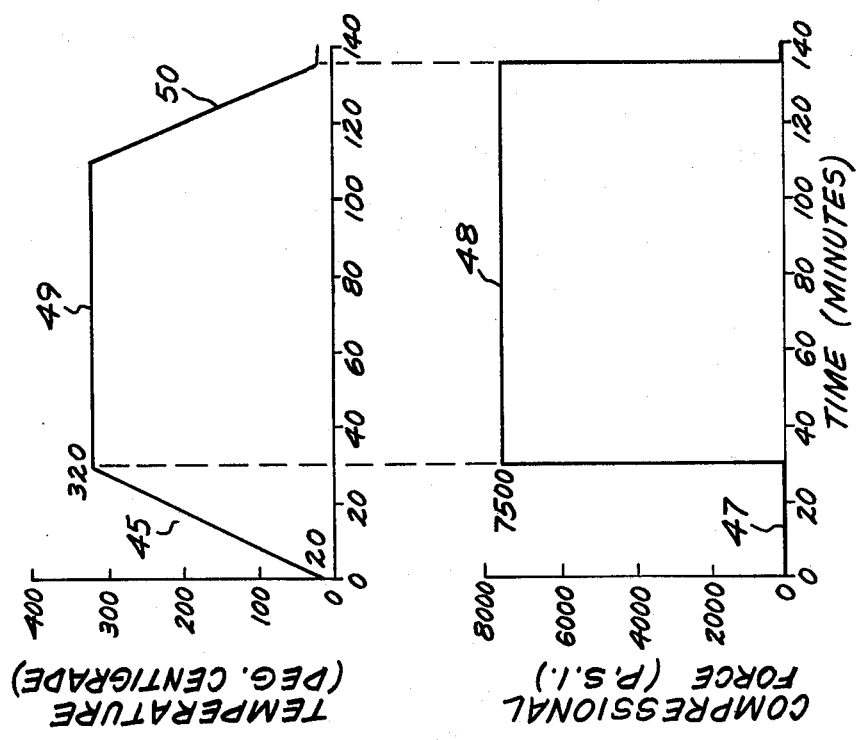
FIG. 6
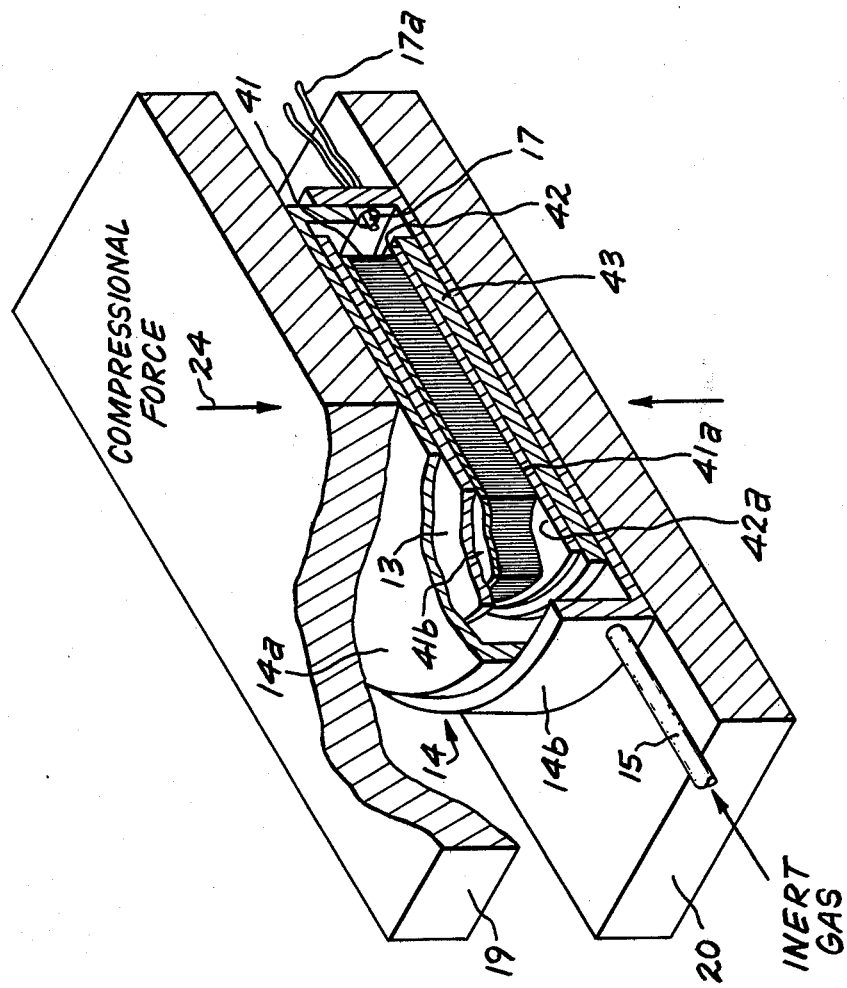

METHOD OF THERMO-COMPRESSION DIFFUSION BONDING TOGETHER METAL SURFACES

BACKGROUND OF THE INVENTION

The present invention relates to an improved method of thermo-compression diffusion bonding together metal surfaces.

Thermo-compression diffusion bonding is a technique for bonding together a pair of opposing metal surfaces under the influence of thermal energy (i.e., heat) and compressional force. A thermo-compression diffusion bond between metal surfaces is characterized as having an interface region where the metal of the metal surfaces diffuses together to form a continuous metal structure. A prior art method for thermo-compression diffusion bonding is disclosed and claimed in U.S. Pat. No. 4,252,263—D. E. Houston, which is assigned to the same assignee as the present application and is incorporated herein by reference.

In the thermo-compression diffusion bonding method of Houston, first and second articles of metal having first and second opposing metal surfaces to be bonded to each other are placed between a pair of parallel metallic plates. The metallic plates are pulled toward each other with bolts whereby the first and second metal surfaces are placed under a compressional force. The entire assembly is then heated to a desired maximum temperature sufficient for thermo-compression diffusion bonding to occur between the first and second metal surfaces. During this heating process, an additional compressional force is exerted between the first and second metal surfaces due to different rates of thermal expansion of the parallel metallic plates and the bolts. Specifically, the metallic plates expand more than the bolts upon heating, thereby imposing an additional compressional force on the first and second metal surfaces. From the foregoing, it can be appreciated that this additional compressional force is dependent upon the heating of the metal surfaces to be bonded. The present inventors have discovered that an improved bond can be obtained by utilizing the present improved method of thermo-compression diffusion bonding. In the improved method, heating of metal surfaces to be bonded is controlled independently of the compressional force pressing these surfaces together.

OBJECTS OF THE INVENTION

Accordingly, it is an object of the present invention to provide an improved method of thermo-compression diffusion bonding together a pair of metal surfaces wherein the heating of the metal surfaces is controlled independently of the compressional force pressing together these surfaces.

It is a further object of the invention to provide an improved method of thermo-compression diffusion bonding together a pair of metal surfaces wherein the resulting bond is superior to that obtained by the prior art method of thermo-compression diffusion bonding described above.

It is a still further object of the invention to provide an improved method of thermo-compression diffusion bonding together a pair of metal surfaces wherein the time from start to finish of the bonding process is significantly shorter than with the prior art method of bonding described above.

SUMMARY OF THE INVENTION

The objects of the present invention are carried out in an improved method of thermo-compression diffusion bonding together a first metal surface of a first article of metal and an opposing or second metal surface of a second article of metal. In a preferred embodiment of the method, the first and second articles of metal are positioned with the first and second metal surfaces abutting each other. The first and second articles of metal are then disposed in a flexible container which is continuously flushed with an inert atmosphere. The flexible container is placed between a pair of opposing platens of a press. These platens are heated to provide conduction heating of the first and second articles of metal within the flexible container. A compressional force that presses the first and second metal surfaces together is generated by moving the opposing platens of the press towards each other. The generation of the compressional force is controlled independently of the heating of the metal surfaces whereby the improved method of thermo-compression diffusion bonding can be more intricately controlled to provide a superior bond between the first and second metal surfaces.

BRIEF DESCRIPTION OF THE DRAWING FIGURES

The features of the invention believed to be novel are set forth with particularity in the appended claims. The invention itself, however, both as to organization and method of operation, together with further objects and advantages thereof, may best be understood by reference to the following description taken in conjunction with the accompanying drawing figures in which:

FIG. 5 is also a view similar to FIG. 1 except that still different articles of metal to be bonded together are illustrated; and FIG. 6 shows a pair of graphs also similar to FIG. 2 except that the graphs correspond to FIG. 5.

DETAILED DESCRIPTION OF THE INVENTION

Figure 1:
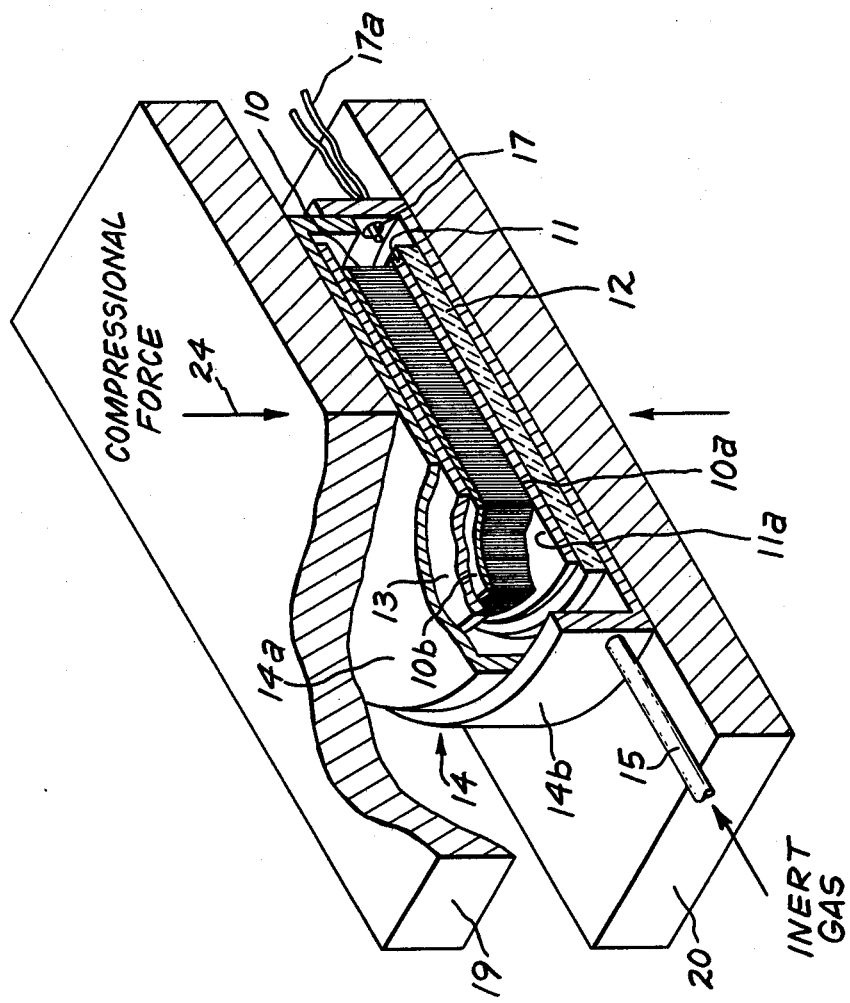
FIG. 1 is a schematic view partially in cross-section and partially broken away illustrating first and second articles of metal having first and second metal surfaces that are to be bonded together and, additionally, illustrating one form of apparatus suitable for implementing the inventive thermo-compression diffusion bonding technique.

FIG. 1 illustrates first and second articles of metal 10 and 11 having first and second opposing metal surfaces 10a and 11a, respectively, that are desired to be bonded together by the method of thermo-compression diffusion bonding. The first article of metal 10 comprises a structured copper strain buffer formed from straight filamentary strands of copper arranged in parallel fashion and closely packed together. The purposes of a structured metal strain buffer and further details of construction thereof are provided in J. W. Butler and H. H. Glascock, II, "Dual SCR Power Module", Proceedings of the IEEE 1980 National Aerospace and Electronics Conference, NAECON 1980 (Dayton, Ohio, May 20-22, 1980), Vol. 2, pages 598-604, incorporated herein by reference. The first article of metal or strain buffer 10 is typically provided with a thin layer of metal foil 10b which is bonded to the upper surface of the strain buffer 10 (typically by thermo-compression diffusion bonding) for holding together the filamentary strands of metal thereof.

The second article of metal 11 comprises a metalized layer on the cathode surface of a semiconductor device 12. The metalized layer 11, which typically comprises about 2 microns thickness of copper, gold, or silver, includes the upper or second metal surface 11a (to be bonded). The metalized layer 11 typically further includes about 1200 Angstroms thickness of titanium beneath the upper surface 11a and, preferably, about 10 microns thickness of aluminum beneath the titanium. A typical semiconductor device 12 comprises silicon. The second metal surface 11a, comprising copper, gold, or silver, normally has a significantly higher coefficient of thermal expansion than does silicon. However, the metalized layer 11 is substantially thinner than the semiconductor device 12 whereby the lower thermal expansion coefficient of the semiconductor device 12 essentially determines the thermal expansion coefficient of the metalized layer 11.

In a preferred method of thermo-compression diffusion bonding, the first and second articles of metal 10 and 11 are disposed within a flexible container 14 that comprises telescoping elements 14a and 14b. The flexible container 14 telescopes in the vertical direction as viewed in FIG. 1. The interior of the flexible container 14 commnicates with a source (not shown) of inert gas through a conduit 15. The temperature of the interior of the container 14 is advantageously measured by a thermocouple 17 which is connected by wires 17a to external circuitry (not shown) for display of the temperature.

Each of the flexible container elements 14a and 14b comprises a heavy-walled, cylindrical portion and a thin, flat portion which preferably is formed of a flexible metal sheet. Each flat portion is suitably joined to the respective cylindrical portion by welding. The reason why each flat portion is thin is to minimize thermally-induced deformations thereof which could interfere with the bonding of the first and second articles of metal 10 and 11. In the preferred method of bonding, the flexible container 14 is disposed between the platens 19 and 20 of a hot press furnace, such as that sold by Pasadena Hydraulics, Inc. of El Monte, California. The platens 19 and 20 are typically formed of steel and the temperature thereof can be controlled by conventional heating means (not illustrated herein).

Also shown within the flexible container 14 is a "buffer" metal layer 13 atop the first article of metal 10. The buffer metal layer 13 is selected to have a maximum or "yield" strength under compression before becoming pliable that is lower in value than the yield strength of either the first or second articles of metal 10 and 11 and, also, the semiconductor device 12. The buffer metal layer 13 serves to buffer or evenly spread out the compressional force 24 which is applied to the first and second articles of metal 10 and 11 during the process of bonding (discussed below). This is accomplished by deforming or yielding of the buffer metal layer 13 at locations thereof that become subject to excessive compressional force, such as a compressional force due to a thicker than average portion of the first article of metal 10. The buffer metal layer 13 should be disposed on the far side of the first article of metal 10 with respect to the semiconductor device 12.

Prior to bonding, the first and second metal surfaces 10a and 11a are prepared for bonding. Such preparation basically entails removing oxides, if present, and other contaminants from the metal surfaces 10a and 11a that would degrade bonding between these surfaces. An exemplary procedure for preparation of the metal surfaces 10a and 11a is described as follows. The first surface 10a of the first article of metal or structured metal strain buffer 10 should be degreased. However, the metal surface 10a should have already been degreased prior to the bonding of the metal foil 10b to the main body of the strain buffer 10. The metal surface 10a is rinsed with deionized water and is allowed to remain wet. The metal surface 10a is advantageously swabbed with hydrofluoric acid which is diluted in water. A suitable concentration of hydrofluoric acid, by way of example, is formed by mixing 50 mililiters of hydrofluoric acid in 100 mililiters of water. The use of hydrofluoric acid has been found to produce better bonds, although the precise mechanism responsible for such better bonds is not fully understood (nor need it be in order to practice the invention). The metal surface 10a is next rinsed with deionized water, then dried with a forced flow of air, or "blow" dried. The metal surface 10a is then abraded with a glass fiber brush to remove oxide. A suitable glass fiber brush is sold by Eraser & Company of Syracuse, New York, as their Super FybRglass eraser. Loose oxide is removed from the metal surface 10a, for example, by subjecting it to a forced flow of air. The metal surface 10a is swabbed with methanol to remove remanent hydrofluoric acid and then it is blow dried. At this point, the metal surface 10a is ready for bonding.

Where the first metal surface 11a comprises copper, oxide therefrom is suitably removed by swabbing with hydrol. A suitable strength of hyrdol is attained with 5 mililiters of hydrochloric acid mixed with 100 mililiters of methanol. The hydrol is suitably rinsed off with methanol and then the metal surface 11a is blow dried. The metal surface 11a is advantageously then swabbed with hydroflouric acid in the concentration noted above with respect to the first article of metal 10. Finally, the second metal surface 11a is rinsed with deionized water and then blow dried. At this point, the second metal surface 11a is ready for bonding.

Where the second metal surface 11a comprises gold, which does not oxidize, it is suitably prepared for bonding simply by rinsing it with methanol and then blow drying it. Where the second metal surface 11a comprises silver, it can be prepared for bonding with the same rinsing step as for gold if it has not become oxidized. This is normally the case where the silver has been stored in an inert atmosphere. However, if the silver has become oxidized, the oxidization should be removed, for example, by subjecting the silver to a low temperature firing in an ambient of hydrogen and then a low temperature firing in an ambient of nitrogen. The foregoing low temperatures should both be approximately 150° C.

In accordance with a first embodiment of the present method of thermo-compression diffusion bonding, the metal surfaces 10a and 11a are preferably exposed to an inert atmosphere, such as nitrogen, prior to heating the first and second articles of metal 10 and 11. This is conveniently accomplished with the apparatus shown in FIG. 1 by continuously flushing the interior of the flexible container 14 with nitrogen gas supplied through the conduit 15. Continuous flushing is required because some of the gas escapes from the interior of the container of the interface region between the elements 14a and 14b of the container.

Figure 2:
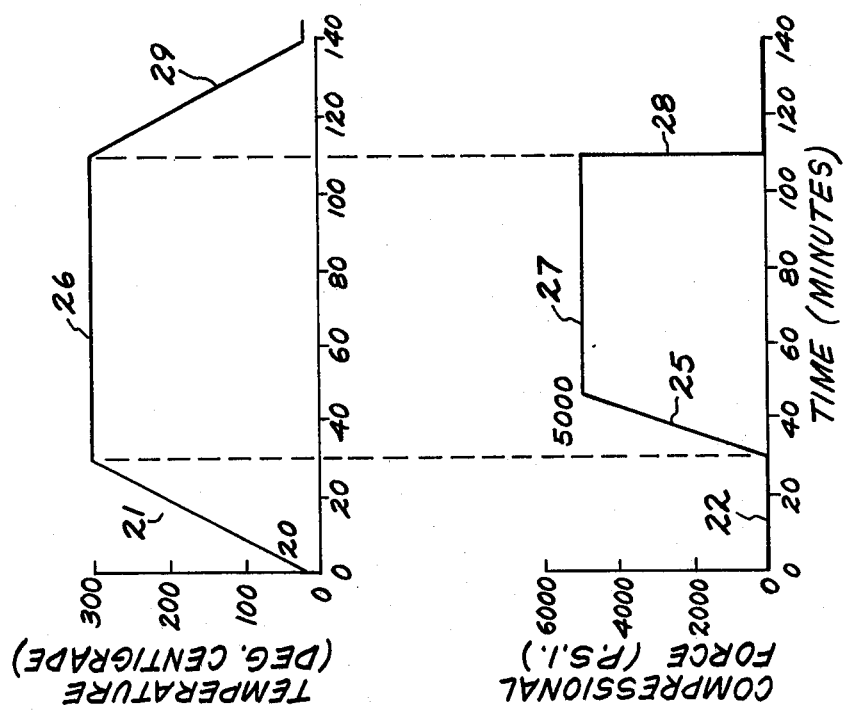
FIG. 2 shows a pair of graphs with the upper one illustrating temperature of the first and second metal surfaces of FIG. 1 versus time and the lower one illustrating the compressional force pressing together the first and second metal surfaces of FIG. 1.

The first and second articles of metal 10 and 11 are heated substantially in accordance with the upper graph illustrated in FIG. 2. The platens 19 and 20 of the hot press are heated by means (not shown) whereby they transfer heat by conduction to the first and second articles of metal 10 and 11 within the flexible container 14. The first and second articles of metal 10 and 11 are allowed to reach a desired maximum temperature for thermo-compression diffusion bonding, which is suitably about 300° C., although it could alternatively have other values within the range from approximately 280° C. to 320° C. This heating is shown by a simplified curve segment 21. During the time that the articles of metal 10 and 11 are being so heated, no compressional force 24 (see FIG. 1) is applied by the platens 19 and 20 to the first and second metal surfaces 10a and 11a, as represented by curve segment 22 showing zero pressure in the lower graph of FIG. 2. A first result of having the articles of metal 10 and 11 heated to the desired maximum temperature while the compressional force 24 is zero is that no bonding occurs until after the articles of metal 10 and 11 have undergone their full thermal expansions. This is significant in that the stress imposed upon the fragile semiconductor device 12 that would result from bonding before the articles of metal 10 and 11 had fully expanded (due to increase in temperature) is avoided. This is especially important where the semiconductor device 12 has a diameter in excess of about two inches. A second result of fully heating the articles of metal 10 and 11 to the desired maximum temperature while the compressional force 24 is zero is that scrubbing of the second article of metal 11 by the first article of metal 10 is avoided. Such scrubbing would be due to the different rates of thermal expansion of the first and second articles of metal 10 and 11 while under a non-zero compressional force 24. Such scrubbing would cause a serious risk of damaging the second article of metal 11 which comprises only a thin coating of metal.

After the articles of metal 10 and 11 are heated to the desired maximum temperature, the compressional force 24 is increased to the desired maximum pressure for thermo-compression diffusion bonding which is suitably about 5000 psi, although it could alternatively have other values within the range from approximately 1500 to 5000 psi. The application of the compressional force 24 preferably is gradual as illustrated by curve segment 25 in the lower graph of FIG. 2. This is calculated to impose a minimum stress upon the fragile semiconductor device 12.

The desired maximum temperature and pressure coexists for about 30 to 120 minutes. As represented by curve segments 26 and 27 in the upper and lower graphs of FIG. 2, a suitable period of time that the maximum temperature coexists with the desired maximum pressure is approximately 65 minutes. During this time, the buffer metal layer 13 "yields" at locations thereof if necessary to accommodate excessive compressional forces at such locations.

At the end of the period of time that the desired maximum temperature coexists with the desired maximum pressure, the pressure may be relieved quickly as indicated by curve segment 28 in the lower graph. The first and second articles of metal 10 and 11 are then allowed to cool as, for example, by removing the flexible container 14 containing these articles of metal from between the platens 19 and 20 which are hot. By relieving the compressional force 24 before the first and second articles of metal are cooled, the first article of metal 10 is allowed to contract more than the second article of metal 11. This enables the semiconductor device 12 to warp or bow before it is cooled, which minimizes the tensile stress placed thereon and which has been found to reduce the likelihood of cracking thereof.

Figure 3:
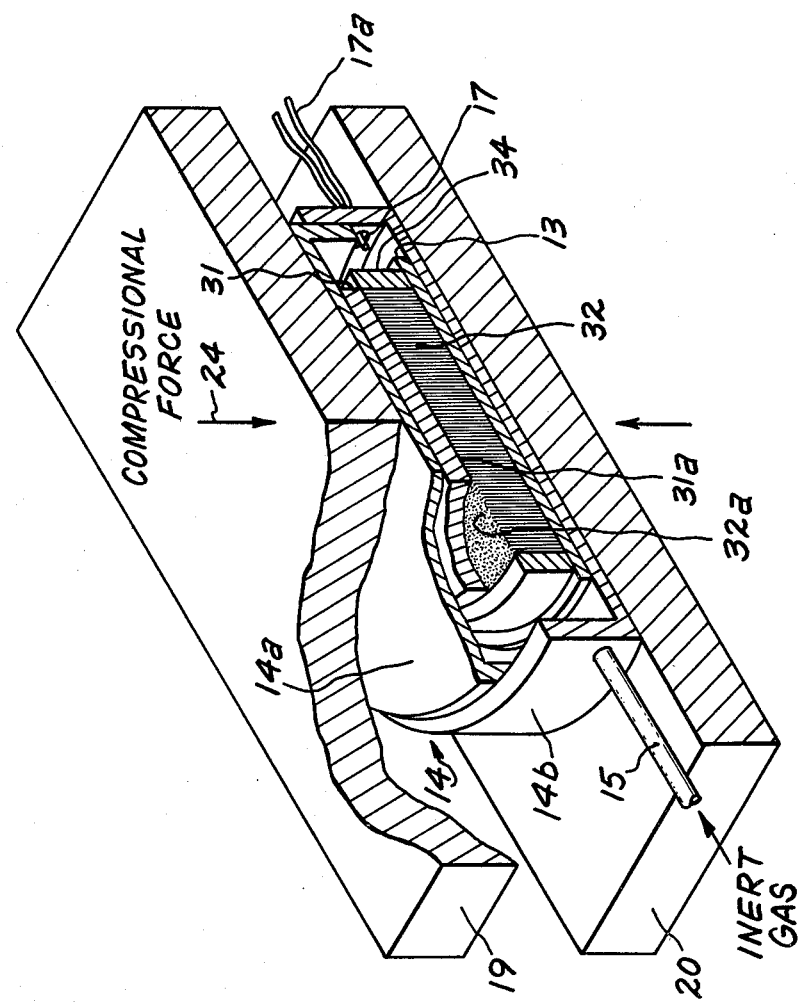
FIG. 3 is a view similar to FIG. 1 except that different articles of metal to be bonded together are illustrated.

Turning to FIG. 3, different first and second articles of metal 31 and 32 are illustrated along with the bonding apparatus illustrated in FIG. 1. The buffer metal layer 13 is disposed beneath the second article of metal 32 in this Figure, althrough it could alternatively be disposed atop the first article of metal 31. The first article of metal 31 comprises solid copper and the second article of metal 32 comprises a structured metal strain buffer formed of copper which is similar to the first article of metal 10 described above with respect to FIG. 1. However, the second article of metal 32 is not provided with a metal foil, such as foil 10b in FIG. 1, to hold the individual filamentary strands thereof together. Rather, a retaining ring 34 encircles the strain buffer 32 and holds it together.

The first and second metal surfaces 31a and 32a of the first and second articles of metal 31 and 32 are prepared for bonding by the following exemplary procedure. The solid copper 31 is degreased by ultrasonic agitation thereof in a bath of 1,1,1,trichloroethane for 10 minutes, and then in a bath of acetone for 10 minutes, after which it is blow dried. The copper 31 is advantageously annealed to render it more pliable, which results in a better bond. Such annealing is suitably accomplished by heating the copper 31 to 800° C. for 30 minutes while in nitrogen atmosphere. Oxidization on the copper 31 is then suitably removed by swabbing the copper 31 with hydrol in the concentration mentioned above with respect to the preparation for bonding of the second article of metal 11 of FIG. 1. The hydrol is suitably removed by rinsing the copper and methanol and then blow drying the copper 31. The copper 31 is then ready for bonding.

In preparing the second surface 32a for bonding, it is suitably degreased with the same method used for the first metal surface 31a described in the preceding paragraph. Thereafter, the same procedures used for preparing the first metal surface 10a, discussed above, are suitably used to prepare the second metal surface 32a for bonding.

In accordance with a second embodiment of the present method of thermo-compression diffusion bonding, the first and second metal surfaces 31a and 32a are exposed to an inert atmosphere prior to being heated. This is suitably accomplished by continuously flushing the interior of the flexible container 14 with an inert gas through the conduit 15. The compressional force 24 pressing together the first and second metal surfaces 31a and 32a is then increased to a desired maximum pressure in the range between about 5000 and 12,000 psi, or, for example, 10,000 psi as indicated by the curve segment 35 in the lower graph of FIG. 4. The first and second articles of metal 31 and 32 are then heated to a desired maximum temperature for thermo-compression diffusion bonding in the range between about 300° and 400°

Figure 4:
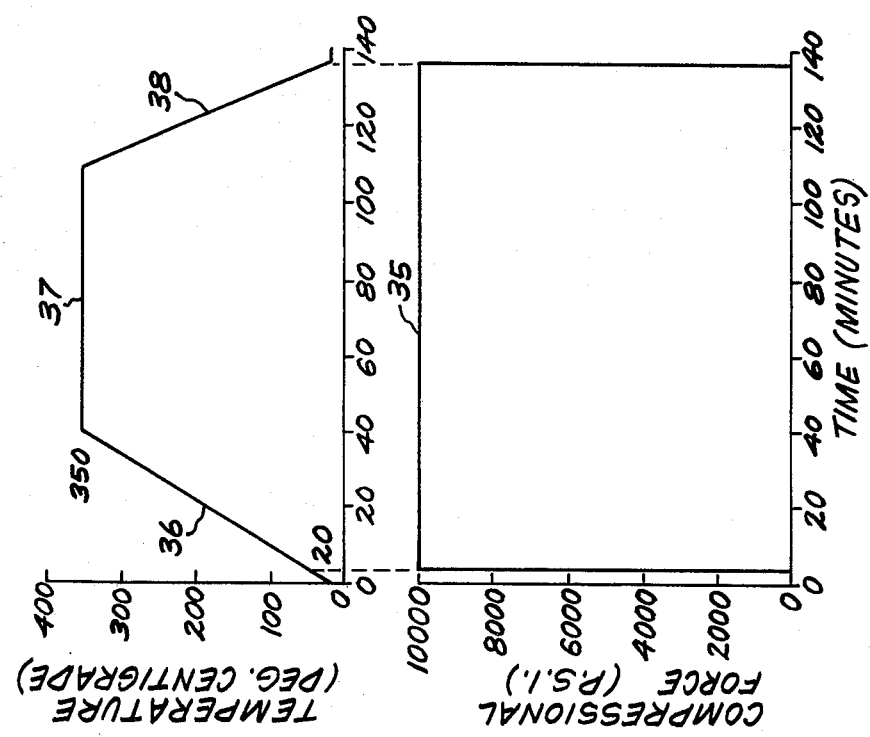
FIG. 4 shows a pair of graphs similar to FIG. 2 except that the graphs correspond to FIG. 3.

C., or, for example, 350° C., as indicated by the simplified curve segment 36 in the upper graph of FIG. 4. Such heating is accomplished by heating the platens 19 and 20 by suitable heating means (not shown). The articles of metal 31 and 32 are held at the desired maximum temperature for about 30 to 120 minutes, or, for example, about 70 minutes as indicated by the curve segment 37 in the upper graph of FIG. 4. After the foregoing period of time at the maximum temperature, the articles of metal 31 and 32 are allowed to cool as, for example, by removing the flexible container 14 from between the hot platens 19 and 20.

By having the compressional force 24 remaining at the desired maximum pressure throughout the heating and cooling of the first and second articles of metal 31 and 32, maximum interaction is provided between the first and second metal surfaces 31a and 32a, whereby a strong bond is obtained between these surfaces.

Turning to FIG. 5, still different first and second articles of metal 41 and 42 are illustrated along with the bonding apparatus illustrated in both FIGS. 1 and 3. The first article of metal 41 comprises a structured copper strain buffer having a first metal surface 41a. The filamentary strands of the strain buffer 41 are held together by a metal foil 41b, as is the case with the first article of metal 10 of FIG. 1. The first article of metal 41 is suitably prepared for bonding in the same manner as is the first article of metal 10 of FIG. 1, described above.

The second article of metal 42 comprises a metalized layer on a metal foil 43. The metal foil 43 comprises a metal with a thermal expansion coefficient which is similar to that of silicon. Two such metals are molybdenum and tungsten. The metal foil 43 has a thickness typically between 0.5 and 5.0 mils. The metalized layer 42 typically comprises a layer of copper, gold, or silver, approximately 2 microns thick, over a titanium layer approximately 1200 Angstroms thick. The second article of metal 42 is suitably prepared for bonding in the same manner as is the second article of metal 11 of FIG. 1, described above.

The buffer metal layer 13 should be disposed on the far side of the first article of metal 41 with respect to the metal foil 43.

In accordance with a third embodiment of the present method of thermo-compression diffusion bonding, the first and second metal surfaces 41a and 42a are exposed to an inert atmosphere prior to being heated. This is suitably accomplished by continuously flushing the interior of the flexible container 14 with an inert gas introduced through the conduit 15.

The first and second articles of metal 41 and 42 are heated to a desired maximum temperature for thermo-compression diffusion bonding by heating the platens 19 and 20 by means (not shown). The desired maximum temperature is between about 300° and 320° C., or, for example, 320° C., as indicated by curve segment 45 of the upper graph of FIG. 6.

During the heating of the articles of metal 41 and 42, the compressional force 24 remains at zero as indicated by curve segment 47 of the lower graph of FIG. 6. As a result of heating the first and second articles of metal 41 and 42 to the desired maximum temperature while the compressional force 24 remains at zero, no bonding occurs between the first and second metal surfaces 41a and 42a until the first and second articles of metal 41 and 42 have fully expanded due to the heating thereof. This minimizes the stress exerted on the article of metal 42. A further advantage of heating the articles of metal 41 and 42 while the compressional force 24 is zero is that scrubbing of the second article of metal 42 by the first article of metal 41 is prevented. Such scrubbing would occur if the compressional force 24 were applied during heating of the articles of metal 41 and 42 due to different rates of thermal expanison of the first and second articles of metal 41 and 42. After the first and second articles of metal and 42 have been heated to the desired maximum temperature, the compressional force 24 is increased to a desired maximum pressure for thermo-compression diffusion bonding. The desired maximum pressure is between about 2500 and 10,000 psi, or, for example, 7500 psi as indicated by curve segment 48 in the graph of FIG. 6. The first and second articles of metal 41 and 42 are maintained at the desired maximum temperature for 30 to 100 minutes. A suitable time is 80 minutes as indicated by curve segment 49 of the upper graph of FIG. 6. The first and second articles of metal 41 and 42 are then cooled as, for example, by removing the flexible container 14 from between the hot platens 19 and 20.

The result of cooling the first and second articles of metal 41 and 42 while the compressional force 24 is still at the desired maximum pressure is that warping or bowing of the metal foil 43 as it is cooled is minimized.

It can be appreciated from the foregoing that the present invention provides an improved method of thermo-compression diffusion bonding together a pair of metal surfaces wherein the heating of the metal surfaces is controlled independently of the compressional force pressing together these surfaces. Further, it can be appreciated that the method of the present invention provides a bond which is superior to the bond obtained by the prior art bonding method described above.

Additionally, the method of the present invention allows a shorter "cycling" time (that is, time from start to finish) of thermo-compression diffusion bonding than is provided by the prior art technique of bonding as discussed above. This can be appreciated from the following. Because the platens 19 and 20 can be heated independently of the compressional force 24 applied thereby, the platens 19 and 20 can remain continuously heated to a desired maximum temperature for thermo-compression diffusion bonding. After first and second articles of metal have been bonded, they can be removed from the flexible container 14, and further first and second articles of metal placed therein. The flexible container 14 can then be re-inserted between the already hot platens to undergo a new cycle of bonding. Thus, a short cycling time of thermo-compression diffusion bonding is provided. This is a very significant advantage for facilitating the manufacture of devices including first and second articles of metal bonded together by the method of thermo-compression diffusion bonding.

While only certain preferred features of the invention have been shown by way of illustration, many modifications and changes will occur to those skilled in the art. For example, the articles of metal 10 (FIG. 1) and 41 (FIG. 5) could comprise metal other than copper as specifically disclosed above. Aluminum would be a suitable metal. Additionally, the first and second articles of metal 31 and 32 (FIG. 3) could comprise a metal other than copper, such as aluminum. It is, therefore, to be understood that the appended claims are intended to cover the foregoing and all such modifications and changes as fall within the true spirit of the invention.

What is claimed as our invention and desired to be secured by Letters Patent of the United States is:

1. An improved method of thermo-compression diffusion bonding a first metal surface of a first article of metal to a second metal surface of a second article of metal, said second article of metal comprising a metalized layer on a semiconductor device, the improved method comprising the steps of:
   (a) exposing said first and second metal surfaces to an inert atmosphere;
   (b) heating said first and second articles of metal to a desired maximum temperature for thermo-compression diffusion bonding;
   (c) pressing together said first and second metal surfaces to a desired maximum pressure, said pressing together occurring only after said first and second articles of metal have reached substantially said desired maximum temperature; and
   (d) cooling from substantially said desired maximum temperature said first and second articles of metal, said cooling step occurring independently of said pressing together step.

2. The method of claim 1 wherein said desired maximum temperature is between about 280° and 300° C. and said desired maximum pressure is between about 1500 and 5000 pounds per square inch.

3. The method of claim 1 wherein said pressing together step comprises initially pressing together said first and second metal surfaces with a pressure increasing at a maximum rate of about 300 pounds per square inch for each minute until said desired maximum pressure is reached.

4. The method of claim 1 wherein said semiconductor device comprises silicon.

5. The method of claim 4 wherein said semiconductor device has a diameter in excess of about 2 inches.

6. The method of claim 1 wherein said second article of metal comprises a metal selected from the group consisting of copper, gold, and silver.

7. The method of claim 6 wherein said first article of metal comprises straight filamentary strands of copper arranged in parallel fashion and closely packed together.

8. The method of claim 1 wherein said cooling step occurs only after said pressing together step has been substantially terminated.

9. The method of claim 7 wherein said cooling step comprises continuously cooling said first and second articles of metal from said desired maximum temperature to a final, stable temperature.

10. The method of claim 1 wherein said first and second articles of metal are disposed in a flexible container prior to said exposing step.

11. The method of claim 10 wherein said exposing step comprises continuously flushing said flexible container with an inert gas.

12. The method of claim 1 wherein said heating step comprises conduction heating of said first and second articles of metal from a pair of heated opposing platens of a press.

13. The method of claim 12 wherein said pressing together step comprises moving said opposing platens of a press towards each other while said first and second articles of metal are disposed between said platens.

14. The method of claim 12 further comprising the step of disposing a buffer metal layer between said platens prior to said pressing together step, said buffer metal layer comprising a metal having a lower yield strength under compression than said first and second articles of metal.

15. The method of claim 1 wherein said cooling step comprises continuously cooling said first and second articles from said desired maximum temperature to a final, stable temperature.

16. The method of claim 1 wherein said first article of metal comprises straight filamentary strands of metal arranged in parallel fashion and closely packed together.

17. An improved method of thermo-compression diffusion bonding a first metal surface of a first article of metal to a second metal surface of a second article of metal, said second article of metal comprising a metalized layer on a metal foil, said metal foil being selected from one of the group consisting of molybdenum and tungsten, the improved method comprising the steps of:
   (a) exposing said first and second metal surfaces to an inert atmosphere;
   (b) heating said first and second articles of metal to a desired maximum temperature for thermo-compression diffusion bonding;
   (c) pressing together said first and second metal surfaces to a desired maximum pressure, said pressing together occurring only after said first and second articles of metal have reached substantially said desired maximum temperature; and
   (d) cooling from substantially said desired maximum temperature said first and second articles of metal, said cooling occurring independently of said pressing together step.

18. The method of claim 17 wherein said first article of metal comprises copper.

19. The method of claim 17 wherein said desired maximum temperature is between about 300° and 320° C. and said desired maximum pressure is between about 2500 and 10,000 pounds per square inch.

20. The method of claim 17 wherein said foil has a thickness between about 0.5 and 5.0 mils.

21. The method of claim 17 wherein said second article of metal comprises a metal selected from the group consisting of copper, gold, and silver.

22. The method of claim 17 wherein said cooling step substantially fully occurs while said first and second metal surfaces are being pressed together to substantially said maximum desired pressure.

23. The method of claim 17 wherein said second article of metal comprises straight filamentary strands of metal arranged in parallel fashion and closely packed together.

24. The method of claim 23 wherein said filamentary strands of metal are comprised of copper.

25. The method of claim 17 wherein said first and second articles of metal are disposed in a flexible container prior to said exposing step.

26. The method of claim 25 wherein said exposing step comprises continuously flushing said flexible container with an inert gas.

27. The method of claim 17 wherein said heating step comprises conduction heating of said first and second articles of metal from a pair of heated opposing platens of a press.

28. The method of claim 27 wherein said pressing together step comprises moving said opposing platens of a press towards each other while said first and second articles of metal are disposed between said platens.

29. The method of claim 27 further comprising the step of disposing a buffer metal layer between said platens prior to said pressing together step, said buffer metal layer comprising a metal having a lower yield strength under compression than said first and second articles of metal.

* * * * *